US009847980B2

(12) United States Patent
Burger et al.

(10) Patent No.: US 9,847,980 B2
(45) Date of Patent: Dec. 19, 2017

(54) PROTECTING COMMUNICATIONS WITH HARDWARE ACCELERATORS FOR INCREASED WORKFLOW SECURITY

(71) Applicant: Microsoft Technology Licensing, LLC, Redmond, WA (US)

(72) Inventors: Douglas Christopher Burger, Bellevue, WA (US); Eric S. Chung, Woodinville, WA (US); Kenneth Eguro, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 14/742,702

(22) Filed: Jun. 17, 2015

(65) Prior Publication Data

US 2016/0373416 A1 Dec. 22, 2016

(51) Int. Cl.
*H04L 29/06* (2006.01)
*H04L 9/32* (2006.01)
(Continued)

(52) U.S. Cl.
CPC .......... *H04L 63/0464* (2013.01); *G06F 21/72* (2013.01); *H04L 9/14* (2013.01);
(Continued)

(58) Field of Classification Search
CPC ..... H04L 9/0825; H04L 9/08; H04L 63/0428; H04L 63/0435; H04L 63/062;
(Continued)

(56) References Cited

U.S. PATENT DOCUMENTS 6,324,676 B1 11/2001 Burnham et al.
6,904,527 B1 6/2005 Parlour et al.
(Continued)

FOREIGN PATENT DOCUMENTS

GB 2511779 * 9/2014

OTHER PUBLICATIONS

"International Search Report and Written Opinion Issued in PCT Application No. PCT/US2016/032950", dated Jul. 19, 2016, 11 Pages.
(Continued)

*Primary Examiner* — Carlos M De Jesus Lassala
(74) *Attorney, Agent, or Firm* — The Watson IP Group, PLC; Vladan M. Vasiljevic

(57) ABSTRACT

To protect customer data and provide increased workflow security for processing requested by a customer, a secure communicational channel can be established between a customer and one or more hardware accelerators such that even processes executing on a host computing device hosting such hardware accelerators are excluded from the secure communicational channel. An encrypted bitstream is provided to hardware accelerators and the hardware accelerators obtain therefrom cryptographic information supporting the secure communicational channel with the customer. Such cryptographic information is stored and used exclusively from within the hardware accelerator, rendering it inaccessible to processes executing on a host computing device. The cryptographic information can be a shared secret, an appropriate one of a pair of cryptographic keys, or other like cryptographic information. Similarly, the encrypted bitstream can comprise the cryptographic information, computer-executable instructions executable by the processing circuitry of the hardware accelerator to derive such cryptographic information, or combinations thereof.

20 Claims, 5 Drawing Sheets

(51) Int. Cl.
*G06F 21/72* (2013.01)
*H04L 9/14* (2006.01)
*H04L 9/30* (2006.01)

(52) U.S. Cl.
CPC .............. *H04L 9/30* (2013.01); *H04L 9/3234* (2013.01); *H04L 63/0485* (2013.01); *H04L 63/08* (2013.01); *H04L 63/0435* (2013.01); *H04L 63/0442* (2013.01)

(58) Field of Classification Search
CPC ... H04L 63/0442; H04L 63/06; H04L 47/125; H04L 67/1002; H04L 29/06707; H04L 9/30; H04L 9/3263; H04L 63/0823; H04L 63/0464; H04L 9/14; H04L 63/0485; H04L 63/08; H04L 9/3234; G06F 21/72; G06F 21/76
See application file for complete search history.

(56) References Cited

U.S. PATENT DOCUMENTS

| | | | |
|---|---|---|---|
| 6,996,713 B1 | 2/2006 | Trimberger | |
| 7,269,738 B1 | 9/2007 | Kivimaki | |
| 7,725,738 B1 | 5/2010 | Langhammer et al. | |
| 7,788,502 B1 | 8/2010 | Donlin et al. | |
| 7,792,302 B2 | 9/2010 | Oren et al. | |
| 8,065,517 B2 | 11/2011 | Cizas et al. | |
| 8,516,268 B2 | 8/2013 | Woodall | |
| 8,601,598 B2* | 12/2013 | Ozzie | H04L 63/0428 380/43 |
| 8,732,468 B2 | 5/2014 | Roy et al. | |
| 2002/0161834 A1* | 10/2002 | Rescorla | H04L 29/06 709/203 |
| 2002/0199110 A1 | 12/2002 | Kean | |
| 2003/0014650 A1* | 1/2003 | Freed | H04L 29/06 713/189 |
| 2004/0005061 A1* | 1/2004 | Buer | G06F 21/602 380/282 |
| 2004/0123121 A1* | 6/2004 | Paaske | H04L 9/14 713/189 |
| 2006/0265603 A1 | 11/2006 | McLean et al. | |
| 2007/0038853 A1* | 2/2007 | Day | H04L 63/0281 713/153 |
| 2008/0065885 A1* | 3/2008 | Nagai | G06F 21/72 713/168 |
| 2008/0181399 A1 | 7/2008 | Weise et al. | |
| 2010/0228971 A1* | 9/2010 | Carles | H04L 9/3271 713/163 |
| 2011/0225428 A1 | 9/2011 | Stufflebeam, Jr. et al. | |
| 2013/0191629 A1* | 7/2013 | Treinen | H04L 9/08 713/153 |
| 2013/0227702 A1* | 8/2013 | Jun | G06F 21/6254 726/26 |
| 2013/0266141 A1* | 10/2013 | Kim | H04W 12/02 380/270 |
| 2013/0346758 A1 | 12/2013 | LaMacchia et al. | |
| 2013/0346759 A1 | 12/2013 | LaMacchia et al. | |
| 2014/0075184 A1* | 3/2014 | Gorbach | H04L 63/06 713/155 |
| 2014/0089674 A1* | 3/2014 | Buehl | G06F 12/14 713/189 |
| 2014/0281520 A1* | 9/2014 | Selgas | H04L 63/0442 713/165 |

OTHER PUBLICATIONS

Menezes, et al., "Handbook of Applied Cryptography", CRC Press Publishers, Oct. 16, 1996, 49 Pages.

Marolia, Pratik M., "Watermarking FPGA Bitstream for IP Protection", In Master Thesis, Aug. 2008, 54 pages.

Guajardo, et al., "Physical Unclonable Functions and Public-Key Crypto for FPGA IP Protection", In Proceedings of International Conference on Field Programmable Logic and Applications, Aug. 27, 2007, pp. 189-195.

\* cited by examiner

PROTECTING COMMUNICATIONS WITH HARDWARE ACCELERATORS FOR INCREASED WORKFLOW SECURITY

BACKGROUND

Modern computer networking hardware enables physically separate computing devices to communicate with one another orders of magnitude faster than was possible with prior generations of networking hardware. Consequently, it has become more practical to perform digital data processing at locations remote from the user requesting such processing, or on whose behalf such processing is being performed. Large quantities of data processing capability are being aggregated into centralized locations that comprise dedicated hardware and support systems including hundreds or thousands of computing devices, typically mounted in vertically oriented racks. Such a collection of computing devices, as well as the associated hardware necessary to support such computing devices, and the physical structure that houses the computing devices and associated hardware, is traditionally referred to as a "data center". By aggregating computing devices and dedicated hardware, a data center can offer processing services to its customers and an advantageous cost compared with what such customers would have to pay to independently acquire such processing and support services. The customers of the data center, however, are typically independent of the entity providing the data center. Consequently, such customers can seek assurances, such as in the form of agreements with the operator of the data center, regarding the security of such customers' confidential data.

SUMMARY

Specialized processing devices can comprise processing circuitry that is pre-configured to perform a discrete set of computing operations more quickly than generalized central processing units. Hardware accelerators can comprise one or more such specialized processing devices, and their use can be advantageous to customers performing processing at the data center, enabling such customers is processing requests to be performed more quickly and often at a lower aggregate power consumption. To protect customer data and provide increased workflow security for processing requested by a customer, a secure communicational channel can be established between a customer and one or more hardware accelerators such that even processes executing on a host computing device hosting such hardware accelerators are excluded from the secure communicational channel. An encrypted bitstream can be provided to hardware accelerators by which the hardware accelerators can obtain cryptographic information with which to establish a secure communicational channel with the customer. Such cryptographic information is stored and maintained within the hardware accelerator and is, thereby, inaccessible to processes executing on a host computing device. The cryptographic information can be a shared secret, an appropriate one of a pair of cryptographic keys, or other like cryptographic information. Similarly, the encrypted bitstream can comprise the cryptographic information, computer-executable instructions executable by the processing circuitry of the hardware accelerator to derive such cryptographic information, or combinations thereof. The cryptographic bitstream can be encrypted with a unique key of an individual hardware accelerator, that can be physically encoded as part of the hardware accelerator and can be verified by a trusted third-party. Should a customer require secure communicational channels with additional hardware accelerators, such as for increased processing capacity or load-balancing, the necessary cryptographic information can be exchanged among individual hardware accelerators in a data center in a like manner as originally established between the customer and an initial hardware accelerator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
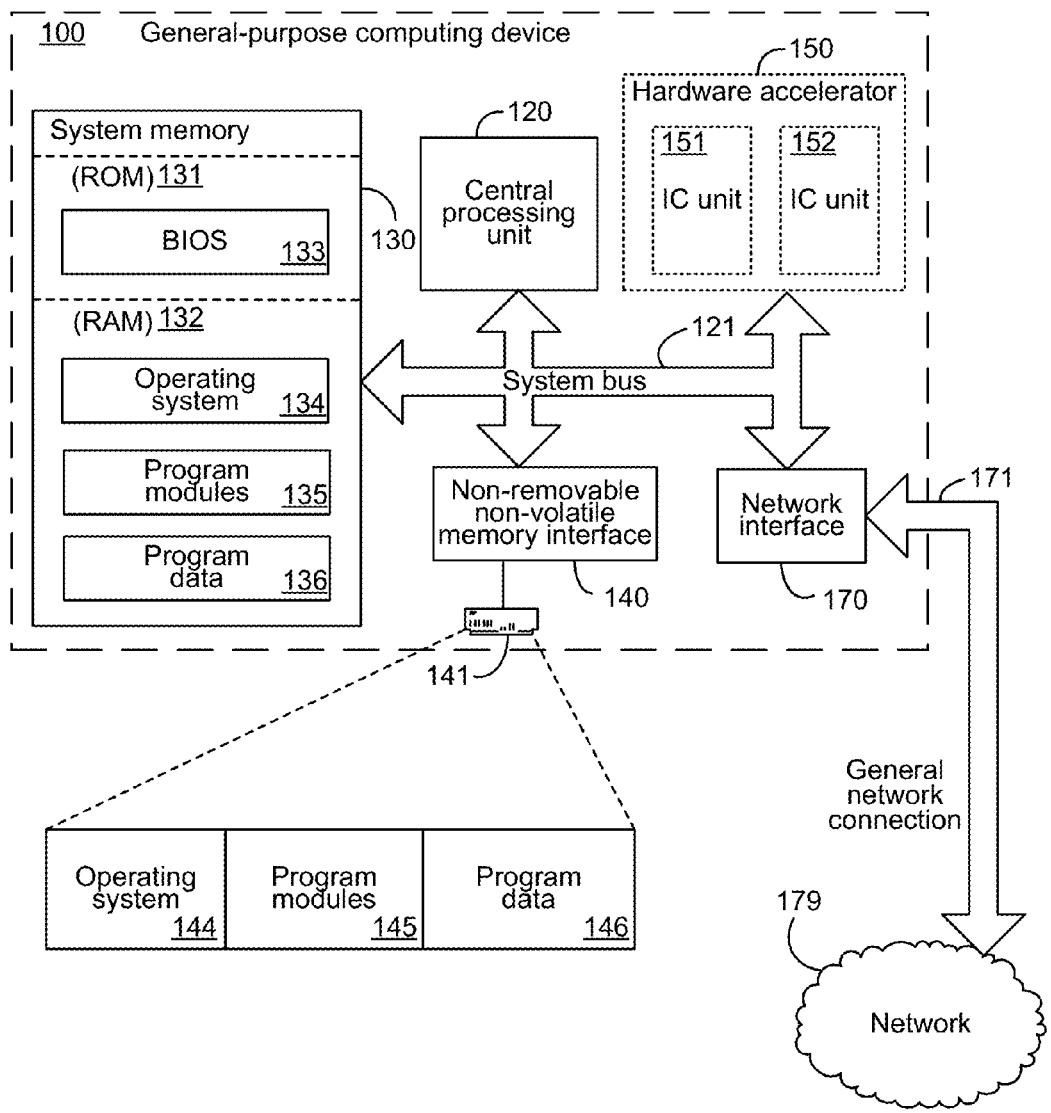
FIG. 1 is a block diagram of an exemplary computing device comprising an exemplary hardware accelerator.

The following description relates to protecting the processing of workflows, and increasing their security, in a data center context, by establishing secure communicational channels directly between clients of the data center and hardware accelerators hosted by computing devices of the data center. Hardware accelerators can comprise specialized processing devices can comprise processing circuitry that is pre-configured to perform a discrete set of computing operations more quickly than generalized central processing units. An encrypted bitstream can be provided to hardware accelerators by which the hardware accelerators can obtain cryptographic information with which to establish a secure communicational channel with the customer. Such cryptographic information is stored and maintained within the hardware accelerator and is, thereby, inaccessible to processes executing on a host computing device. The cryptographic information can be a shared secret, an appropriate one of a pair of cryptographic keys, or other like cryptographic information. Similarly, the encrypted bitstream can comprise the cryptographic information, computer-executable instructions executable by the processing circuitry of the hardware accelerator to derive such cryptographic information, or combinations thereof. The cryptographic bitstream can be encrypted with a unique key of an individual hardware accelerator, that can be physically encoded as part of the hardware accelerator and can be verified by a trusted third-party. Should a customer require secure communicational channels with additional hardware accelerators, such as for increased processing capacity or load-balancing, the necessary cryptographic information can be exchanged among individual hardware accelerators in a data center in a like manner as originally established between the customer and an initial hardware accelerator.

The techniques described herein make reference to hardware accelerators, such as are comprised of customized, typically task-specific, processing circuitry, which traditionally performs specific processing tasks more quickly and efficiently then general-purpose central processing units. However, the mechanisms described are not limited to the specific hardware accelerators described, and can be utilized with any other processing unit, or combinations of multiple processing units, however delineated, that performs computational, or processing, tasks in an accelerated manner.

As utilized herein, the term "hardware accelerator" means any collection of processing circuitry that is specifically optimized to perform a discrete subset of computer processing operations, or execute a discrete subset of computer-executable instructions, such that a computing result is achieved by the hardware accelerator in a shorter duration of processing time than the processing time within which a general-purpose central processing unit that was not so specifically optimized would achieve the same computing result. Consequently, as utilized herein, the adjective "specifically optimized" means that, prior to performance of the discrete subset of computer processing operations, or prior to execution of the discrete subset of computer-executable instructions, by the hardware accelerator, the physical circuitry of the hardware accelerator that implements logic functionality is either configured, manufactured, or modified to perform the discrete subset of computer processing operations or execute the discrete subset of computer-executable instructions to the exclusion of other computer processing operations or other computer-executable instructions. To the extent that such configuration or modification occurs after the hardware accelerator has already been manufactured, such a hardware accelerator will be termed "configurable" herein. Thus, as utilized herein, the term "configurable", as applied to hardware accelerators, means a hardware accelerator whose physical circuitry that implements logic functionality can be configured or modified, after the hardware accelerator has been manufactured, to perform the discrete subset of computer processing operations or execute the discrete subset of computer-executable instructions to the exclusion of other computer processing operations or other computer-executable instructions. By contrast, as utilized herein, the term "general-purpose central processing unit" means a central processing unit whose physical circuitry that implements logic functionality, as opposed to the physical circuitry that provides for temporary storage of binary data, remains invariant and can execute any computer-executable instructions programmed for such a central processing unit. Additionally, as utilized herein, the terms "processing unit" and "processing circuitry" mean a collection of one or more hardware circuits that is capable of executing computer-executable instructions or performing computer processing operations.

Although not required, the descriptions below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, servers, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated which can perform some or all of the mechanisms and actions described below. The exemplary computing device 100 can include conventional computing hardware, such as will be detailed below, and can optionally include a hardware accelerator, such as the exemplary hardware accelerator 150, illustrated in FIG. 1 via dashed lines to indicate that it is an optional component. As indicated previously, a hardware accelerator comprises processing circuitry that is specifically optimized to perform a discrete subset of computer processing operations, or execute a discrete subset of computer-executable instructions, in an accelerated manner, or with more efficient power utilization, than such operations would be performed, or such instructions would be executed, by a general-purpose, or generalized, central processing unit that was not so specifically optimized, such as, for example, one of the one or more central processing units (CPUs) 120.

For purposes of illustration, the exemplary hardware accelerator 150, shown in FIG. 1, is illustrated as comprising multiple integrated circuits, such as the exemplary integrated circuits 151 and 152. Such integrated circuits can include Application-Specific Integrated Circuits (ASICs), Field Programmable Gate Arrays (FPGAs) or other Very Large Scale Integrated circuits (VLSIs). The integrated circuits 151 and 152 of the exemplary hardware accelerator 150 can be specifically optimized to perform a discrete subset of computer processing operations, or execute a discrete subset of computer-executable instructions, in an accelerated manner. For example, the exemplary hardware accelerator 150 can be optimized to perform video compression. As another example, the exemplary hardware accelerator 150 can be optimized to execute specific ranking algorithms. In such instances, the various integrated circuits 151 and 152 of the exemplary hardware accelerator 150 can be configured or manufactured such that the physical circuits performing logic operations are configured or manufactured to specifically perform a discrete set of computer processing operations that implement the video compression algorithm, for example, or the ranking algorithm, as another example. By way of a hardware-specific example, the gate arrays of an FPGA can have particular voltages applied to specific gates in order to configure those gates to perform logic operations that result in the performance of one or more specific computer processing operations, such as those computer processing operations that implement the video compression or ranking algorithms. Consequently, as utilized herein, the terms "computer-readable media" and "computer storage media", as explicitly defined below, include the circuitry of a hardware accelerator, such as the exemplary hardware accelerator 150. Similarly, the term "computer-executable instructions", as utilized herein, includes the configuration of circuitry, such as by establishing or applying specific voltages to specific circuit elements, that enables such circuitry to perform computer processing operations in accordance with such computer-executable instructions.

Turning to the rest of the exemplary computing device 100, in addition to the exemplary CPU 120, and the exemplary hardware accelerator 150, the exemplary computing device 100 can further comprise a system memory 130, and a system bus 121 that couples various system components including the system memory to the processing unit 120 and the hardware accelerator 150. The system bus 121 may be any of several types of bus structures including a memory bus or memory controller, a peripheral bus, and a local bus using any of a variety of bus architectures. Depending on the specific physical implementation, one or more of the CPUs 120, the hardware accelerator 150, the system memory 130 and other components of the computing device 100 can be physically co-located, such as on a single chip or silicon die or on a single circuit board. In such a case, some or all of the system bus 121 can be nothing more than silicon pathways within a single chip structure or on a single die and its illustration in FIG. 1 can be nothing more than notational convenience for the purpose of illustration.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media, as defined and delineated above. The hard disk drive 141 is typically connected to the system bus 121 through a non-volatile memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. The computing device 100 is illustrated as being connected to the general network connection 171 through a network interface or adapter 170, which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Although described as a single physical device, the exemplary computing device 100 can be a virtual computing device, in which case the functionality of the above-described physical components, such as the CPU 120, the system memory 130, the network interface 170, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 100 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

Figure 2:
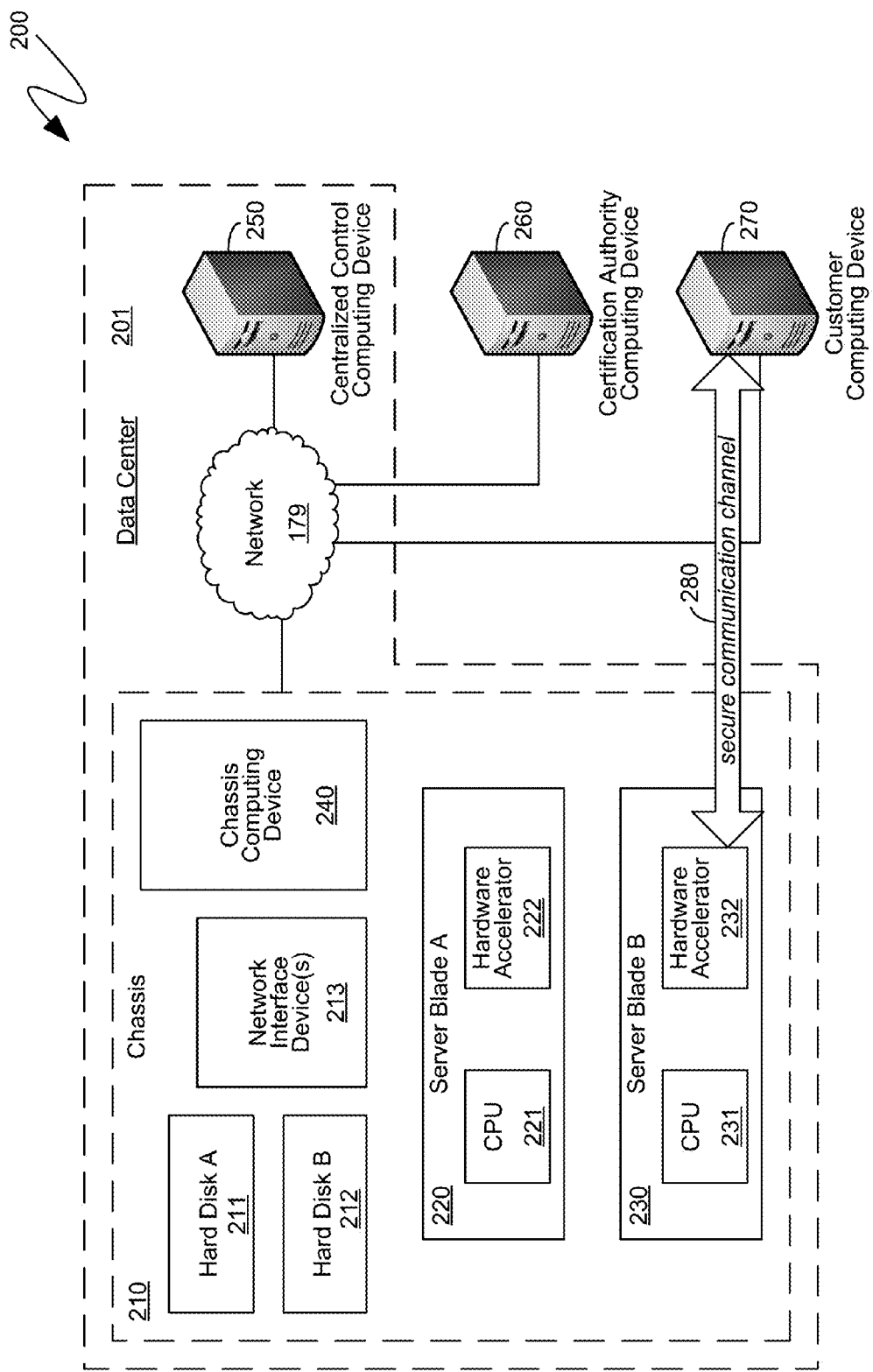
FIG. 2 is a block diagram of an exemplary system comprising an exemplary data center providing secure communicational channels to individual hardware accelerators.

According to one aspect, the computing device 100 can be a server computing device within the context of a data center. As such, and turning to FIG. 2, the exemplary system 200 shown therein illustrates a multi-computing device chassis, such as would typically be found in a data center, in the form of the exemplary chassis 210 illustrated within the context of an exemplary data center 201. Additionally, the exemplary system 200 of FIG. 2 further illustrates a separate control computing device, in the form of the exemplary centralized control computing device 250, which can be communicationally coupled to the exemplary chassis 210 through a network, such as the network 179 described above. The exemplary centralized control computing device 250 can be co-located with exemplary chassis 210, such as within the exemplary data center 201 as shown in FIG. 2. Alternatively, the exemplary centralized control computing device 250 can be remotely located such as in a centralized control location. Multiple centralized control computing devices can exert hierarchical control over the computing devices of the data center and, in such an example, some centralized control computing devices can be co-located within the data center itself, such as the exemplary centralized control computing device 250 shown in the exemplary data center 201, while others of the centralized control computing devices can be remotely located.

As illustrated by the system 200 of FIG. 2, the exemplary chassis 210 can comprise one or more server blades, such as the exemplary server blades 220 and 230. As will be recognized that those skilled in the art, server blades can be server computing devices, having componentry analogous to at least some of the componentry of the exemplary computing device 100, described in detail above and illustrated in FIG. 1, except that such server computing devices can be physically configured in the form of a "blade", or other physical arrangement in which components are spread out along two dimensions thereby facilitating stacking of multiple such server computing devices within a single chassis, such as the exemplary chassis 210. For simplicity of illustration, rather than showing each component of the server blades, FIG. 2 only illustrates the CPUs and hardware accelerators of the exemplary server blades 220 and 230 that are shown therein, namely the CPUs 221 and 231, and the hardware accelerators 222 and 232, respectively. Additionally, while the exemplary chassis 210 is illustrated as comprising two server blades, namely the exemplary server blades 220 and 230, those of skill in the art will recognize that typical chassis in a data center environment can comprise many more server blades, and the descriptions below are independent of the quantity of server blades within a specific chassis.

The exemplary chassis 210, shown in FIG. 2, can also comprise components that can be utilized by, and shared between, various server blades of the exemplary chassis 210. For example, the exemplary chassis 210 can comprise storage devices, such as the exemplary hard disks 211 and 212. Alternatively, or in addition, such storage devices can be part of the individual server blades, such as the exemplary server blade 220. The exemplary chassis 210 can also comprise network interface devices, such as the exemplary network interface device 213. As will be recognized by those skilled in the art, network interface devices can include network interface cards, routers, network cabling, switches, and other like network interface devices. According to one aspect, the chassis 210 can comprise a separate computing device, such as the exemplary chassis computing device 240, that can manage the other components of the chassis, including the processing tasks assigned to various server blades of the chassis.

To provide context for the descriptions below, also communicationally coupled to the network 179 can be a trusted third-party computing device, such as the certification authority computing device 260. As will be recognized by those skilled in the art, a trusted third-party, such as a certification authority, can be an entity that is independently trusted by two counterparties seeking to establish a secure communicational channel between them. Within the exemplary system 200 of FIG. 2, the two counterparties seeking to establish a secure communicational channel can be an operator of the exemplary data center 201 and a customer of such a data center 201, such as a customer using the exemplary customer computing device 270 to communicate with the computing devices of the exemplary data center 201.

As indicated previously, by aggregating various computing devices, auxiliary hardware, and functional support systems, a data center, such as the exemplary data center 201, can offer computing performance and reliability that can be expensive or impractical for individual customers to independently obtain on their own. Consequently, such customers provide computing tasks to the data center, which are then performed by the computing devices of the data center on behalf of such customers, and the results of such computing tasks returned to the customers, such as through communications between computing devices across a network, such as the exemplary network 179. In return for the performance of such computing tasks, a data center is compensated by its customers. However, as also indicated previously, due to the lack of control that customers have over the data center itself and the various other processes executing on the computing devices of such a data center, customers can be hesitant to entrust private, secretive, or otherwise secure computing tasks to a data center.

By way of a simple example, one customer of a data center can be an automobile manufacturer that can seek to utilize the processing capabilities of the data center to perform processor intensive modeling and simulation of automotive designs. Such a customer, can, however, be hesitant to utilize a data center for such computing tasks because such a customer could suffer irreparable and extensive financial and reputational harm should its automotive designs be obtained by other entities. Consequently, for such a customer, it can be desirable to receive assurances that only computing processes executed on behalf of such a customer can have access to such data. To provide such assurances, according to one aspect, a data center operator can provide mechanisms by which a customer can establish secure communicational channels, such as the exemplary secure communicational channel 280, between the computing devices of such a customer and individual hardware accelerators such as, for example, the exemplary hardware accelerator 232. In such a manner, the customer can take advantage of the increased processing capability and efficiency of a hardware accelerator in performing defined tasks, while ensuring that such processing remains secure and not accessible to other processes, including processes executing on the same host computing device, such as the exemplary server blade 230, or elsewhere within the data center 201.

Figure 3:
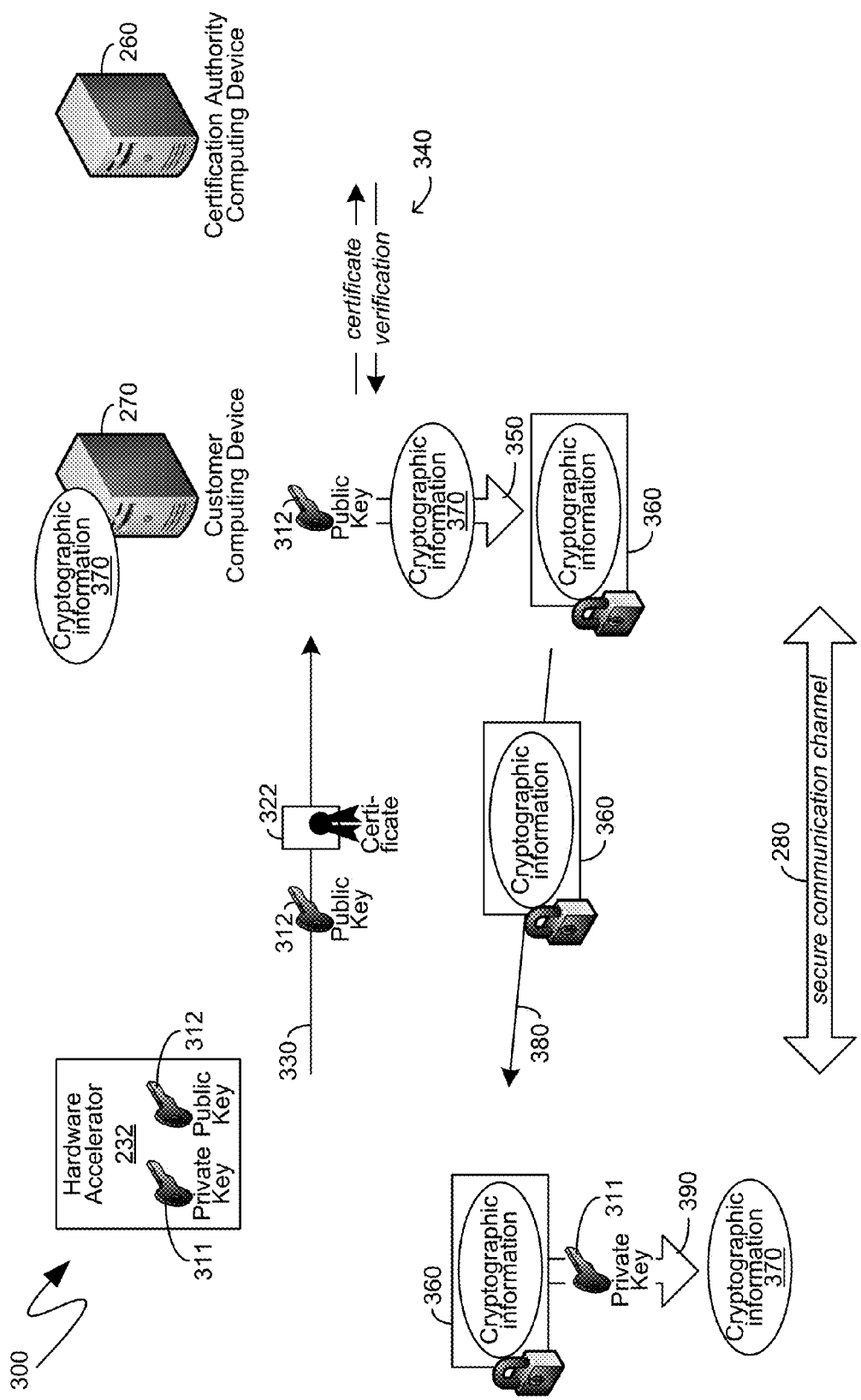
FIG. 3 is a communicational flow diagram of an exemplary establishing of a secure communicational channel to a hardware accelerator.

Turning to FIG. 3, the communicational flow diagram 300 shown therein illustrates an exemplary series of communications and acts performed by various computing or processing devices. More specifically, communicational flow diagram 300 illustrates an exemplary establishing of a secure communicational channel, such as the exemplary secure communicational channel 280, between a computing device controlled by a customer of a data center, such as the exemplary customer computing device 270, and a hardware accelerator hosted by a computing device of such a data center, such as the exemplary hardware accelerator 232. In the example illustrated in FIG. 3, a hardware accelerator, such as the exemplary hardware accelerator 232, can comprise initial, preinstalled cryptographic information, such as the exemplary private key 311 and corresponding public key 312. For example, such cryptographic keys can be written onto an integrated circuit, or other like portion of the hardware accelerator 232, at the time that the hardware accelerator 232 is manufactured. The cryptographic keys of a hardware accelerator, such as the exemplary hardware accelerator 232, can be accessible only to computer operations being executed by the hardware accelerator 232. Consequently, other processes executing on a host computing device, such as the exemplary server blade 230 (shown in FIG. 2) that hosts the hardware accelerator 232, cannot obtain access to the cryptographic keys of the hardware accelerator, including cryptographic keys originally stored on the exemplary hardware accelerator 232, and cryptographic keys subsequently provided or derived. More generally, cryptographic information retained by, and used by, a hardware accelerator can, from among processes executing on a host computing device and components of the host computing device, be accessible only to the hardware accelerator itself. As such, the cryptographic keys of a hardware accelerator, including the cryptographic keys that can be preinstalled when the hardware accelerator is manufactured, can be incredibly difficult to obtain for processes executing outside of the hardware accelerator, and, as a result, such keys can be used as a cryptographic root of trust.

The establishment of the exemplary secure communicational channel 280 can, according to such an aspect, and as illustrated in the exemplary communicational flow diagram 300 FIG. 3, commence with a customer being provided with the initial, preinstalled cryptographic information, such as the exemplary public key 312, of a hardware accelerator, such as the exemplary hardware accelerator 232. The provision of the exemplary public key 312 is illustrated in FIG. 3, by the exemplary communication 330, as coming from the exemplary hardware accelerator 232 itself. Alternatively, the public key 312 can be provided, such as to the exemplary customer computing device 270, by processes executing elsewhere within the data center such as, for example, processes executing on the general-purpose CPU of a computing device hosting the hardware accelerator 232. For example, such processes can have access to one or more tables that can associate specific hardware accelerators with corresponding initial cryptographic information preinstalled on such hardware accelerators. As yet another alternative, the public key 312 can be provided to the exemplary customer computing device 270 by processes executing external to the data center such as, for example, a trusted third-party, such as the exemplary certification authority computing device 260.

According to one aspect, the provision of initial, preinstalled cryptographic information, such as the exemplary public key 312, of a hardware accelerator, can be accompanied with a certificate, such as the exemplary certificate 322, by which a customer receiving such information can verify that the public key 312 is, indeed, of a hardware accelerator of the data center. For example, as illustrated by the exemplary communicational flow diagram 300 of FIG. 3, communications 340 between a customer computing device receiving the public key 312 and corresponding certificate 322, such as the exemplary customer computing device 270, and a trusted third-party, such as the certification authority computing device 260, can enable processes executing on the customer computing device 270 to verify the received public key 312.

To establish the exemplary secure communication channel 280, the customer computing device 270 can comprise cryptographic information 370 that can be shared with an endpoint of the secure communication channel 280, such as the exemplary hardware accelerator 232. For example, the cryptographic information 370 can comprise a secret that can be shared with both endpoints, thereby enabling encryption of communications between those two endpoints utilizing what is known as a "shared secret" cryptographic approach in which each endpoint encrypts and decrypts communications destined to, and received from, the other endpoint utilizing the same secret that is shared between them, and is otherwise not known to, or accessible by, other computing devices. As another example, detailed further below, the cryptographic information 370 can comprise a bitstream that can configure the hardware accelerator 232 such that the hardware accelerator 232 can perform computing operations by which it derives or establishes the necessary information for establishing and maintaining the secure communicational channel 280 with the customer computing device 270.

To provide the cryptographic information 370 to the hardware accelerator 232, and, thereby, establish the secure communication channel 280, the cryptographic information 370 can be encrypted, such as by utilizing the provided initial, preinstalled cryptographic information of the hardware accelerator 232, such as the hardware accelerator's public key 312. The cryptographic information can then be provided to the hardware accelerator 232. Thus, as illustrated by the operation 350 of FIG. 3, the exemplary customer computing device 270 can utilize the hardware accelerator's public key 312 to encrypt the cryptographic information 370, thereby generating the encrypted cryptographic information 360. Alternatively, other processes acting on behalf of the customer can encrypt the cryptographic information 370 and provide it to the hardware accelerator 232. More specifically, rather than trusting the customer with the cryptographic keys of the hardware accelerator 232, such initial, preinstalled cryptographic information of the hardware accelerator 232 can be maintained in escrow by a trusted third party that is trusted by both the data center and the customer. When a customer desires to establish a secure communication channel with the hardware accelerator, such as the exemplary secure communication channel 280 with the exemplary hardware accelerator 232, the customer can contact such a trusted third-party and request that the trusted third party encrypt the cryptographic information 370, utilizing the cryptographic keys of the hardware accelerator 232 that such a trusted third party is holding in escrow, thereby generating the encrypted cryptographic information 360. Such encrypted cryptographic information 360 can then be returned, by the trusted third party, to the customer computing device 270, or can be provided directly to the hardware accelerator 232.

Turning back to the exemplary communicational flow diagram 300 of FIG. 3, the generated encrypted cryptographic information 360 can be communicated to the hardware accelerator 232, as illustrated by the communication 380. Because the hardware accelerator 232 can be hosted by a computing device, according to one aspect, the communication 380 can be received by such a host computing device and then stored into a region of memory that the hardware accelerator 232 can also access. The hardware accelerator 232 can then, simply, be provided with a pointer to such a location in memory in which the communication 380 was stored by the host computing device, and can retrieve therefrom the encrypted cryptographic information 360.

While the encrypted cryptographic information 360 can be accessible to other processes executing on such a host computing device, and, indeed on any intermediate computing device through which the communication 380 passes, only a computing device having access to the private key 311, corresponding to the public key 312 that was utilized to generate encrypted cryptographic information, can decrypt the encrypted cryptographic information 360 and obtained therefrom the cryptographic information 370. As indicated previously, the private key 311 can be securely maintained as part of the hardware accelerator 232, such as in a region, or circuitry, of the hardware accelerator 232 that can only be accessed by processes being executed by the hardware accelerator 232. Utilizing such an exemplary public key 311, the exemplary hardware accelerator 232 can decrypt the encrypted cryptographic information 360, as illustrated by the action 390, and derive therefrom the cryptographic information 370. With both endpoints, namely the hardware accelerator 232, and the customer computing device 270, now in possession of the cryptographic information 370, the secure communication channel 280 between them can be established, such as in the manner detailed above.

As indicated previously, according to one aspect, the encrypted cryptographic information 360 can be in the form of an encrypted bitstream that can be provided to the exemplary hardware accelerator 232, such as detailed above, decrypted by the hardware accelerator 232, as also detailed above, and then loaded onto the hardware accelerator 232 for execution by the hardware accelerator 232. For example, if the hardware accelerator 232 comprises one or more FPGAs, then the encrypted cryptographic information 360, in the form of an encrypted bitstream, can, when decrypted by the hardware accelerator 232, provide a bitstream that can delineate how the individual gates of the FPGA are configured such that the processing performed by the FPGA, having its gates configured in the manner delineated by the, now decrypted, bitstream, generates the cryptographic information 370, or otherwise performs the computing operations that establish and maintain the secure communication channel 280 with the customer computing device 270.

Figure 4:
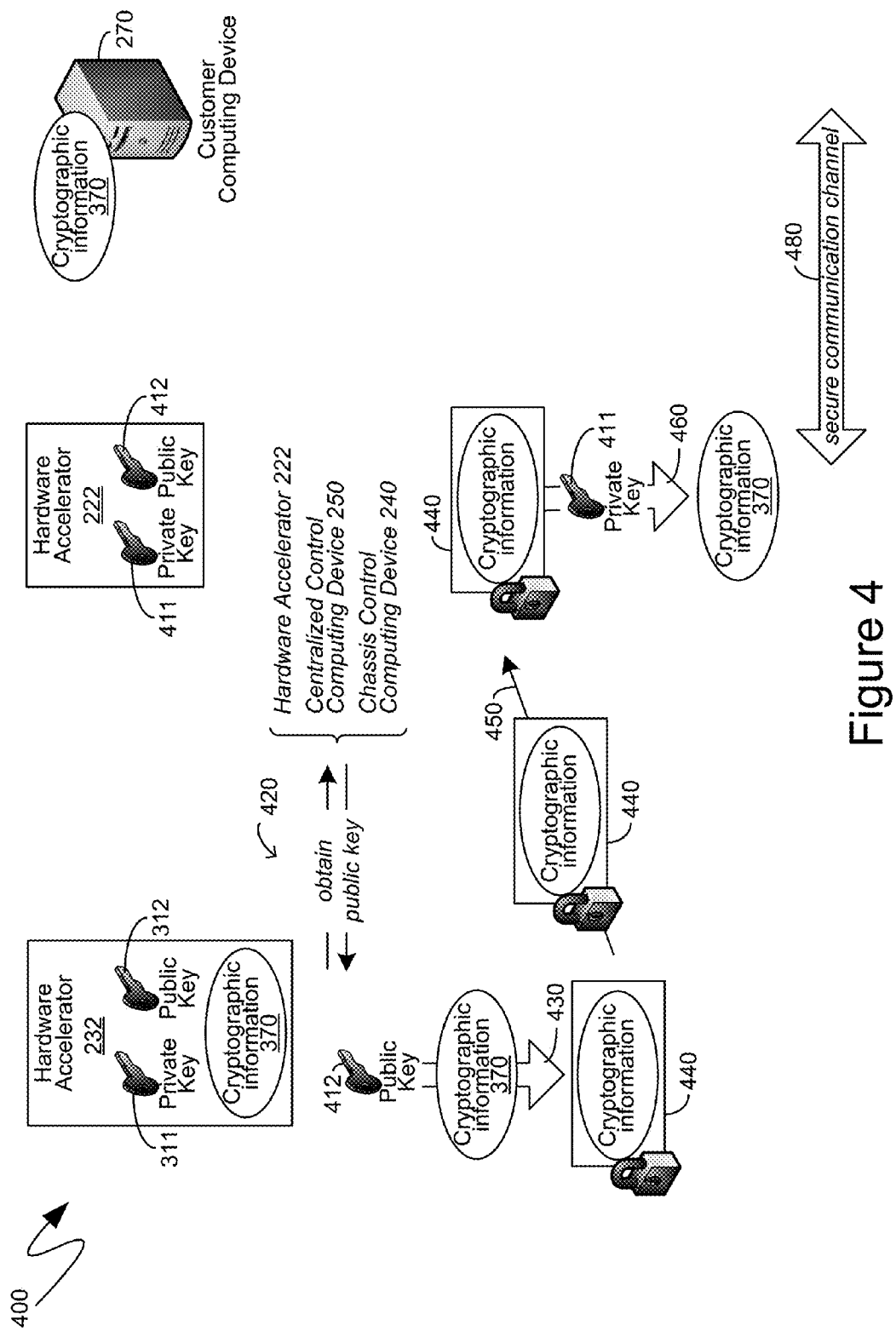
FIG. 4 is a communicational flow diagram of an exemplary establishing of a subsequent secure communicational channel to another hardware accelerator by a hardware accelerator with whom a secure communicational channel was previously established.

Turning to FIG. 4, the exemplary communicational flow diagram 400 shown therein illustrates an exemplary series of communications among different hardware accelerators by which one hardware accelerator, already provisioned with the cryptographic information 370, can provision a second, different hardware accelerator with the same cryptographic information 370, thereby enabling a customer to utilize the same cryptographic information 370 to establish secure communicational channels with either of such hardware accelerators and, thereby, facilitate parallel processing, load sharing, or other like multi-processor functionality. For example, a customer can request access to additional hardware accelerators, triggering the operations exemplarily illustrated by FIG. 4. As another example, processes monitoring the operation of the data center can detect that processing requested by a customer should be load balanced to a different hardware accelerator, or can be more optimally performed utilizing multiple hardware accelerators executing in parallel. While, in one aspect, the establishment of subsequent secure communicational channels with other hardware accelerators can be performed by simply repeating the communications of the exemplary communicational flow diagram 300 shown in FIG. 3, and described in detail above, the establishment of subsequent secure communicational channels can, likewise, be performed among the hardware accelerators and, consequently, can be performed internally to the data center.

As illustrated in FIG. 4, a hardware accelerator with which a customer has already established an existing secure communication channel, such as the exemplary hardware accelerator 232, can already comprise the cryptographic information 370 that can be utilized to establish such a secure communication channel with the customer. Such a hardware accelerator can share such cryptographic information 370 with other hardware accelerators such as, for example, the exemplary hardware accelerator 222 shown in FIG. 4. To share the cryptographic information 370, the hardware accelerator 232 can obtain the initial, preinstalled cryptographic information that is associated with the hardware accelerator 222, as represented by the communications 420. The hardware accelerator 232 can obtain such initial, preinstalled cryptographic information in the same manner as the customer obtained the initial, preinstalled cryptographic information of the hardware accelerator 232, which was described in detail above. More specifically, the hardware accelerator 232 can obtain the initial, preinstalled cryptographic information of the hardware accelerator 222 from another, trusted computing device, such as that maintained by a certificate authority. As another example, processes executing within the data center can maintain tables correlating hardware accelerators to initial, preinstalled cryptographic information associated with such hardware accelerators. In such an example, the hardware accelerator 232 can communicate with such processes to obtain the initial, preinstalled cryptographic information that is associated with the hardware accelerator 222. For example, as illustrated in FIG. 4, such tables can be maintained by a centralized control computing device, such as the exemplary centralized control computing device 250, a chassis control computing device, such as the exemplary chassis control computing device 240, or combinations thereof.

Once a hardware accelerator, such as the exemplary hardware accelerator 232, obtains the initial, preinstalled cryptographic information of another hardware accelerator, such as the exemplary hardware accelerator 222, the hardware accelerator 232 can encrypt the cryptographic information 370 accordingly and provide it to such other hardware accelerator. For example, the specific example illustrated in FIG. 4 shows the exemplary hardware accelerator 222 as comprising a public/private key pair in the form of the exemplary private key 411 and corresponding exemplary public key 412. As indicated previously such keys can have been installed and stored onto the hardware accelerator 222 at the time that the hardware accelerator 222 was manufactured. With the public key 412 of the exemplary hardware accelerator 222, the cryptographic information 370 can be encrypted, as illustrated by the action 430, to generate the encrypted cryptographic information 440. As before, the encryption action 430 can be performed by the hardware accelerator 232, or on its behalf, such as by a trusted third-party authority, which is not specifically shown in FIG. 4.

Once generated, the encrypted cryptographic information 440 can be provided to the hardware accelerator 222, such as is illustrated by the communication 450 in FIG. 4. The hardware accelerator 222 can then obtain the cryptographic information 370 from the encrypted cryptographic information 440 that it received, as illustrated by the action 460. For example, analogously to the process described above, if the encrypted cryptographic information 440 was generated by encrypting the cryptographic information 370 with the public key 412 of the hardware accelerator 222, then the hardware accelerator 222 can utilize the corresponding private key 411, to decrypt the encrypted cryptographic information 440 and obtain therefrom the cryptographic information 370. As another example, again, analogously to the process described above, the encrypted cryptographic information 440 can comprise an encrypted bitstream that can be loaded onto the hardware accelerator 222, such as by configuring various gates or other like circuit elements of the hardware accelerator 222 to execute the computer-executable instructions of the encrypted bitstream. Such computer-executable instructions can be executed by the hardware accelerator 222 to derive, or otherwise obtain, the cryptographic information 370 or otherwise perform computing operations to establish and maintain the secure communication channel 480 with the customer computing device 270.

With the cryptographic information 370, the hardware accelerator 222 can establish a secure communication channel 480 with a customer computing device, such as the exemplary customer computing device 270, in an analogous manner to the establishment of the secure communication channel 280, not shown explicitly in FIG. 4, between the exemplary customer computing device 270 and the hardware accelerator 232. In such a manner, a customer can securely communicate data and computer executable instructions to multiple hardware accelerators. Such flexibility can be beneficial in situations where the processing requested by the customer is most efficiently performed in parallel. In such instances, processes executing within the data center, such as part of one or more centralized control computing devices, can, such as in response to an explicit request by the customer, assign specific hardware accelerators to perform the customer's processing. The customer can be provided with addressing information for such hardware accelerators, or for host computing devices hosting such hardware accelerators. Cryptographic information sufficient to establish secure communicational channels between a customer computing device and each of such hardware accelerators can be internally propagated within the data center, such as in the manner detailed above, and shown in FIG. 4. Subsequently, the exemplary customer computing device 270 can establish secure communicational channels to the hardware accelerators assigned to such client, and the processing desire to be performed by the client can be provided to each such hardware accelerator, including providing such processing in parallel.

The flexibility afforded by being able to securely provision multiple hardware accelerators with the cryptographic information 370 necessary to establish secure communication channel with the customer computing device can also be useful in load-balancing situations. By way of a simple example, a single hardware accelerator, such as the exemplary hardware accelerator 232, can comprise cryptographic information associated with multiple different customers, and utilizing such cryptographic information the hardware accelerator 232 can maintain multiple different secure communication channels with those multiple different customers. If each of those customers seeks to have processing performed by the hardware accelerator 232, the hardware accelerator 232 can quickly become over-scheduled, resulting in unacceptable delays in performing customers' processing. A load balancer, such as a process executing on one or more control computing devices, can detect such a condition and can seek to transfer some of the processing to a different hardware accelerator, such as, for example, the exemplary hardware accelerator 222. The transferred processing, however, can be of a customer whose cryptographic information is not currently maintained by the hardware accelerator 222. Rather than burdening the customer with provisioning yet another hardware accelerator, the processes described above can enable the hardware accelerator 222 to be provisioned cryptographic information 370 internally to the data center. A customer's processing is load balanced over to the exemplary hardware accelerator 222 can communicate with the exemplary hardware accelerator 222 in a secure manner analogously to how the customer communicated with the hardware accelerator 232.

While the above descriptions have been provided within the context of establishing secure communication channels with customer computing devices, the cryptographic information provided by customers and retained by hardware accelerators can be utilized to protect the customer's information, and processing performed on behalf of the customer, as among other components of a host computing device comprising the hardware accelerator. For example, and with reference again to FIG. 2, a hardware accelerator, such as the exemplary hardware accelerator 232, having been provisioned with cryptographic information provided by a customer, can utilize such cryptographic information to, for example, access encrypted data relevant to such customers' processing, which can be stored on, for example, one of the storage devices 211 and 212 of the chassis 210 that also comprises the exemplary server blade 230 that hosts the hardware accelerator 232. For example, the customers' data can be stored in encrypted form on, for example, exemplary hard disk 211. When such data is to be processed by the exemplary hardware accelerator 232, processes executing on the exemplary CPU 231, for example, can retrieve such encrypted data from the exemplary hard disk 211 and place it into an appropriate memory address space of the memory of the exemplary server computing device 230. The exemplary hardware accelerator 232 can then retrieve such encrypted data from such a memory space and, internally to the hardware accelerator 232, decrypt such data to perform one or more operations with respect to such data and, if necessary, re-encrypt such data. The decryption and subsequent re-encryption can be performed with reference to the cryptographic information with which the exemplary hardware accelerator 232 was provisioned, such as in the manner described in detail above. Processes executing on the exemplary server blade 230, such as processes being executed by the CPU 231, can then retrieve the re-encrypted data and store it back onto the exemplary hard disk 211. In such a manner, the customers' data was only in an unencrypted form internally to the hardware accelerator 232 and was, consequently, not meaningfully accessible to any other device or process of the exemplary chassis 210.

Additionally, as detailed above, the cryptographic information with which a hardware accelerator is provisioned can be any form of cryptographic information. For example, such cryptographic information can be a secret shared by both communicational endpoints and symmetric encryption and decryption can be utilized, where each endpoint utilizes the same secret to both encrypt data for communication to the counterparty endpoint, and decrypt communications received from such a counterparty. As another example, cryptographic information with which a hardware accelerators can be provisioned can be a key pair, such as a public/private key pair, where the public key can be provided to the counterparty endpoint, while the private key can be secretly maintained and utilized to decrypt data encrypted with the public key. Is still another example, various different layers of keys can be derived. For example, the initially provisioned cryptographic information can be utilized to generate subsequent layers of keys including, for example, encryption and decryption keys for accessing encrypted data stored on storage media within the data center, such as the exemplary hard disks 211 and 212, public/private keys for exchanging encrypted messages, and other like keys or layers of keys.

Figure 5:
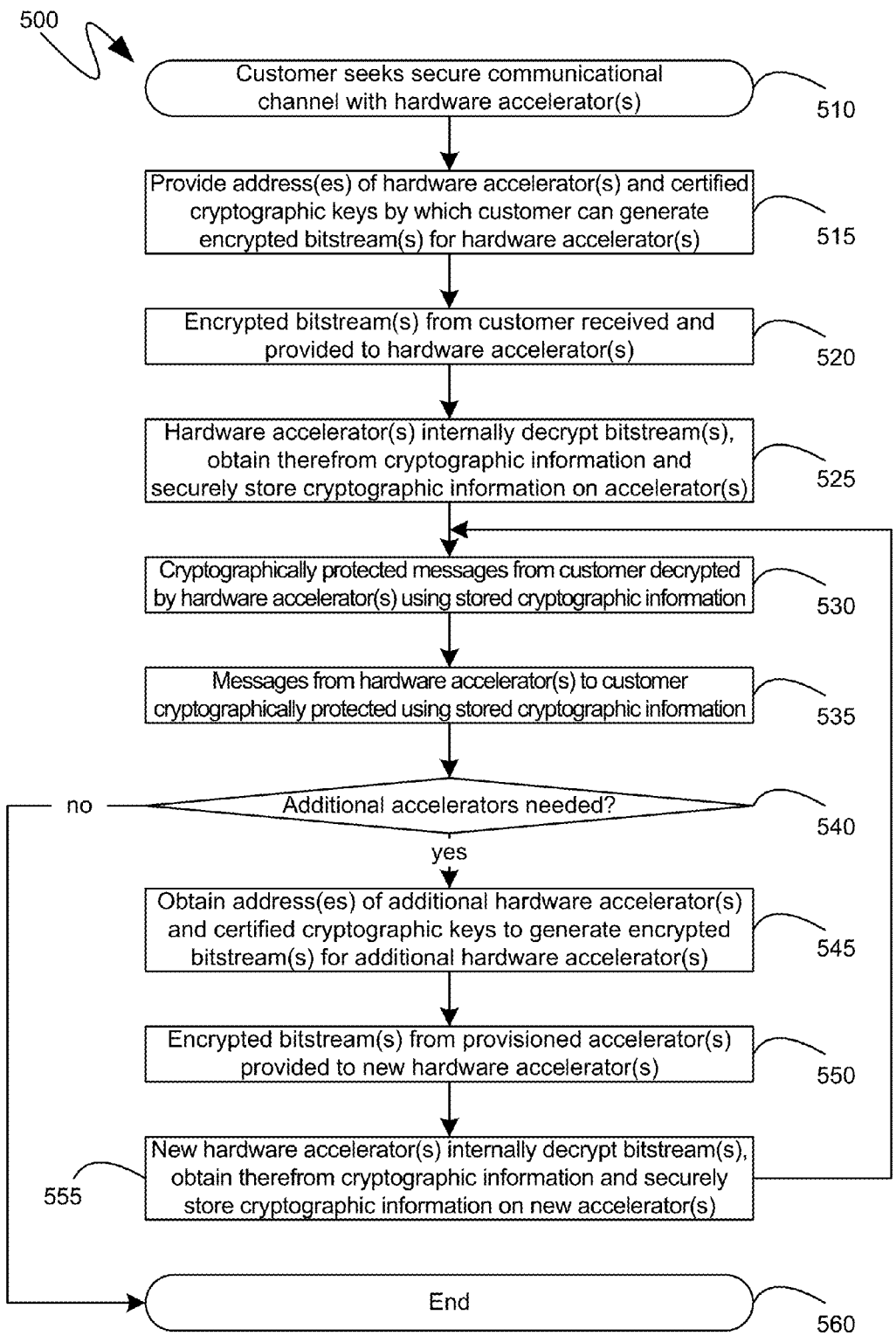
FIG. 5 is a flow diagram of an exemplary establishing of secure communicational channels to hardware accelerators.

Turning to FIG. 5, the exemplary flow diagram 500 shown therein illustrates an exemplary series of steps by which secure communications can be established directly with hardware accelerators, thereby enabling the provision of information, such as data and computer-executable instructions, to such hardware accelerators without such information being accessible to other processes, including processes executing on the same host computing device comprising the hardware accelerators. Initially, as represented by step 510, a customer of a data center can seek to establish a secure communicational channel with one or more hardware accelerators, such as for the purpose of providing sensitive and protected information and computer executable instructions to such hardware accelerators and having such hardware accelerators perform processing and computing tasks on behalf of such customer. In response, at step 515, addresses through which communications can be directed to one or more hardware accelerators selected to receive the customer's processing can be provided to such a customer. Additionally, for purposes of enabling the customer to provision such hardware accelerators with cryptographic information, initial, preinstalled cryptographic information that is already resident on such hardware accelerators and can be utilized to protect information being provided to such hardware accelerators can be provided to the customer. As detailed above, such initial, preinstalled cryptographic information can include certificates or other like data that can verify the provided initial, preinstalled cryptographic information, such as through a trusted third-party. Utilizing such information a customer can generate an encrypted bitstream, such as described in detail above, and provide such an encrypted bitstream to the address received at step 515.

At step 520, the encrypted bitstream from the customer can be received and provided to the hardware accelerator to which it was addressed, such as by storing the encrypted bitstream into memory locations accessible by such a hardware accelerator, and then providing a pointer to such memory locations to the hardware accelerator. Subsequently, at step 525, the hardware accelerator can obtain the encrypted bitstream from memory and internally decrypt it, such as by utilizing the cryptographic information that was initially preinstalled on such a hardware accelerator. As detailed above, the decryption of the encrypted bitstream can provide the hardware accelerator with customer-provided cryptographic information that can be utilized to securely send and receive information to and from such a customer. Such customer-provided cryptographic information can be generated by the processing of computer-executable instructions that were part of the encrypted bitstream, or can simply be data that was contained, in an encrypted form, in the encrypted bitstream. Processing can then proceed to steps 530 and 535 where, at step 530, messages from the customer can be received in an encrypted format, and can be decrypted internally to the hardware accelerator utilizing the customer-provided cryptographic information. Similarly, at step 535, messages to be communicated to the customer can be encrypted, internally to the hardware accelerator, such as by utilizing the customer-provided cryptographic information before being provided to other processes or components of the data center for transmission to the customer.

At step 540, a determination can be made as to whether additional hardware accelerators are to be provisioned with the customers' cryptographic information. As indicated previously, such provisioning can provide flexibility for parallel processing, load-balancing and other like functions. If, at step 540, no additional hardware accelerators should be provisioned with the customer-provided cryptographic information, the relevant processing can end at step 560. Conversely, if, at step 540, additional hardware accelerators should be provisioned with the customer-provided cryptographic information, processing can proceed to step 545 where, internally to the data center, the addresses of such additional hardware accelerators, and cryptographic keys utilizable to generate encrypted bitstreams for such additional hardware accelerators, can be obtained. As detailed above, such information can be maintained, by processes executing in the data center, in a tabular or database form correlating hardware accelerators with initial, preinstalled cryptographic information that can be utilized to encrypt bitstreams directed to such hardware accelerators. Hardware accelerators provisioned, such as at step 525, can generate encrypted bitstreams for hardware accelerators that are to be subsequently provisioned, and can, thereby, securely provide the customers' cryptographic information to such additional hardware accelerators. Such a generation of encrypted bitstreams by already provisioned hardware accelerators is represented by step 550. Subsequently, at step 555, upon receiving such encrypted bitstreams, the hardware accelerators to be subsequently provisioned can, in a manner analogous to step 525, internally decrypt the encrypted bitstreams, such as by utilizing the cryptographic information that was initially preinstalled on such hardware accelerators. As before, the decryption of the encrypted bitstream can provide the hardware accelerator with customer-provided cryptographic information that can be utilized to securely send and receive information to and from such a customer. Such customer-provided cryptographic information can be generated by the processing of computer executable instructions that were part of the encrypted bitstream, or can simply be data that was contained, in an encrypted form, in the encrypted bitstream. Processing can then proceed with steps 530 and 535, with such newly provisioned hardware accelerators now also being able to securely communicate with the customer, as well as access information and/or instructions from other components or processes of the data center where such information and/or instructions are retained in an encrypted form and are, therefore, protected from such other components and processes of the data center.

The descriptions above include, as a first example, a computing device comprising: a general-purpose central processing unit; a hardware accelerator to perform a subset of computing operations of the general-purpose central processing unit, wherein the hardware accelerator processes one or more of the subset of computing operations at a processing speed greater than the general-purpose central processing unit; a network interface to receive a first encrypted communication and to transmit a second encrypted communication; and one or more computer-readable storage medium comprising computer-executable instructions, which, when executed by the hardware accelerator, cause the hardware accelerator to: decrypt the first encrypted communication into a first communication using a first cryptographic key that is stored within the hardware accelerator and which, among processes executing on the computing device and components of the computing device, is only accessible to the hardware accelerator; perform, in accordance with the first communication, at least some of the subset of computing operations that the hardware accelerator is configured to perform; generate a second communication responsive to the first communication; and encrypt the second communication to generate the second encrypted communication using a second cryptographic key that is also stored within the hardware accelerator and which, among processes executing on the computing device and components of the computing device, is also only accessible to the hardware accelerator.

A second example is the computing device of the first example, wherein the first communication comprises a bitstream, which, when loaded onto the hardware accelerator configures the hardware accelerator to perform the at least some of the subset of computing operations in response to the first communication.

A third example is the computing device of the second example, wherein the performance of the at least some of the subset of computing operations for which the bitstream configured the hardware accelerator, generates, on the hardware accelerator, the second cryptographic key.

A fourth example is the computing device of the first example, wherein the first cryptographic key is a preinstalled cryptographic key installed onto the hardware accelerator when the hardware accelerator was manufactured.

A fifth example is the computing device of the fourth example, wherein the first cryptographic is a private key corresponding to a public key that encrypted the first encrypted communication.

A sixth example is the computing device of the first example, wherein the second cryptographic key is a public key of a customer to whom the second encrypted communication is transmitted.

A seventh example is the computing device of the first example, wherein the second cryptographic key is derived from a shared secret cryptographic information that is shared with a customer to whom the second encrypted communication is transmitted.

An eighth example is the computing device of the first example, the hardware accelerator is an FPGA device.

A ninth example is the computing device of the first example, wherein the one or more computer-readable storage medium comprise further computer-executable instructions, which, when executed by the hardware accelerator, cause the hardware accelerator to: request a first set of encrypted data from a storage device that is communicationally coupled to the computing device; and decrypt, within the hardware accelerator, the first set of encrypted data utilizing a cryptographic key obtained from the first communication.

A tenth example is the computing device of the first example, wherein the one or more computer-readable storage medium comprise further computer-executable instructions, which, when executed by the hardware accelerator, cause the hardware accelerator to: obtain a third cryptographic key associated with a second hardware accelerator; encrypt, within the hardware accelerator, using the third cryptographic key, a third communication comprising the second cryptographic key; and transmit the third encrypted communication to the second hardware accelerator.

An eleventh example a system comprising: a computing device comprising a general-purpose central processing unit; a first hardware accelerator to perform a subset of computing operations of the general-purpose central processing unit, wherein the first hardware accelerator processes one or more of the subset of computing operations at a processing speed greater than the general-purpose central processing unit; a second hardware accelerator of a same type as the first hardware accelerator; a first set of computer-readable storage media comprising computer-executable instructions, which, when executed by the first hardware accelerator, cause the first hardware accelerator to: maintain a first secure communication channel with a customer based on a first cryptographic information; obtain a second cryptographic information associated with the second hardware accelerator; generate a first encrypted communication by encrypting the first cryptographic information utilizing the second cryptographic information; and transmit the first encrypted communication to the second hardware accelerator; and a second set of computer-readable storage media comprising computer-executable instructions, which, when executed by the second hardware accelerator, cause the second hardware accelerator to: obtain the first cryptographic information by decrypting the first encrypted communication; and establish a second secure communication channel with the same customer based on the first cryptographic information.

A twelfth example is the system of the eleventh example, wherein the second cryptographic information is a public key of the second hardware accelerator; and wherein further the decrypting of the first encrypted communication is performed by the second hardware accelerator with reference to a private key, associated with the public key, the private key being an initial, preinstalled cryptographic key installed onto the second hardware accelerator when the second hardware accelerator was manufactured.

A thirteenth example is the system of the eleventh example, wherein the first cryptographic information is a shared secret cryptographic information that is shared between the customer and the first hardware accelerator and that is subsequently shared with the second hardware accelerator after the second hardware accelerator decrypts the first encrypted communication.

A fourteenth example is the system of the eleventh example, wherein the first encrypted communication comprises a bitstream, which, when loaded onto the second hardware accelerator configures the second hardware accelerator to generate, on the second hardware accelerator the first cryptographic information.

A fifteenth example is the system of the eleventh example, wherein the computing device comprises one or more computer-readable storage medium comprising computer-executable instructions, which, when executed by the general-purpose central processing unit, cause the computing device to: maintain at least a portion of a table comprising a correlation between the second hardware accelerator and the second cryptographic information.

A sixteenth example is the system of the eleventh example, wherein the computing device comprises one or more computer-readable storage medium comprising computer-executable instructions, which, when executed by the general-purpose central processing unit, cause the computing device to: determine that processing to be performed by the first hardware accelerator on behalf of the customer should, instead, be performed by the second hardware accelerator; and instructing the first hardware accelerator to provision the second hardware accelerator to be able to establish the second secure communication channel with the same customer.

A seventeenth example is the system of the eleventh example, further comprising a storage device having stored thereon a first set of encrypted data; wherein the first set of computer-readable storage media comprise further computer-executable instructions, which, when executed by the first hardware accelerator, cause the first hardware accelerator to: request the first set of encrypted data; and decrypt, within the first hardware accelerator, the first set of encrypted data utilizing the first cryptographic information.

An eighteenth example is the system of the seventeenth example, wherein the second set of computer-readable storage media comprise further computer-executable instructions, which, when executed by the second hardware accelerator, cause the second hardware accelerator to: also request the first set of encrypted data; and also decrypt, within the second hardware accelerator, the first set of encrypted data utilizing the first cryptographic information provided by the first hardware accelerator.

A nineteenth example is a method of increasing workflow security in a data center, the method comprising: receiving, at a computing device of the data center, an encrypted communication from a customer of the data center; providing, to a hardware accelerator hosted by the computing device, the encrypted communication, the hardware accelerator comprising an FPGA device; decrypting, on the hardware accelerator, the encrypted communication using cryptographic information that is stored within the hardware accelerator and is only accessible to the hardware accelerator, the cryptographic information having been provided by the customer; retrieving, by the computing device, on behalf of the hardware accelerator, encrypted data stored on a storage device that is communicationally coupled to the computing device, the retrieving being responsive to the decrypting; providing, to the hardware accelerator, the encrypted data; and decrypting, on the hardware accelerator, the encrypted data using the cryptographic information; wherein the workflow comprises communications to and from the customer and data comprising the encrypted data.

A twentieth example is the method of the nineteenth example, further comprising: providing, by the hardware accelerator, to another, different hardware accelerator, the cryptographic information by encrypting the cryptographic information utilizing a cryptographic key associated with the other, different hardware accelerator in a table maintained by another computing device of the data center.

As can be seen from the above descriptions, mechanisms for increasing the security of workflows in a data center by establishing secure communicational channels from customers directly to hardware accelerators have been presented. In view of the many possible variations of the subject matter described herein, we claim as our invention all such embodiments as may come within the scope of the following claims and equivalents thereto.

We claim:

1. A method of increasing workflow security in a data center, the method comprising:
receiving, at a computing device of the data center, an encrypted communication from a customer of the data center;
providing, to a hardware accelerator hosted by the computing device, the encrypted communication, the hardware accelerator comprising a Field Programmable Gate Array (FPGA) device;
decrypting, on the hardware accelerator, the encrypted communication using cryptographic information that is stored within the hardware accelerator and is only accessible to the hardware accelerator, the cryptographic information having been provided by the customer;
retrieving, by the computing device, on behalf of the hardware accelerator, encrypted data stored on a storage device that is communicationally coupled to the computing device, the retrieving being responsive to the decrypting;
providing, to the hardware accelerator, the encrypted data; and
decrypting, on the hardware accelerator, the encrypted data using the cryptographic information;
wherein the workflow security comprises communications to and from the customer and data comprising the encrypted data.

2. The method of claim 1, further comprising: providing, by the hardware accelerator, to another, different hardware accelerator, the cryptographic information by encrypting the cryptographic information utilizing a cryptographic key associated with the other, different hardware accelerator in a table maintained by another computing device of the data center.

3. The method of claim 2, further comprising:
determining that processing to be performed by the hardware accelerator on behalf of the customer should, instead, be performed by the other, different hardware accelerator; and
instructing the hardware accelerator to provision the other, different hardware accelerator to be able to establish a second, independent workflow with the same customer.

4. The method of claim 2, further comprising:
retrieving, by the computing device, on behalf of the other, different hardware accelerator, the same encrypted data stored on the storage device that is communicationally coupled to the computing device;
providing, to the other, different hardware accelerator, the same encrypted data; and
decrypting, on the other, different hardware accelerator, the encrypted data using the cryptographic information provided by the hardware accelerator.

5. The method of claim 1, further comprising:
receiving, at the computing device, a first encrypted communication from the customer;
providing, to the hardware accelerator, the first encrypted communication;
decrypting, on the hardware accelerator, the first encrypted communication into a first customer communication using a first cryptographic information that is stored within the hardware accelerator and is only accessible to the hardware accelerator;
wherein the cryptographic information provided by the customer is provided, at least in part, by the decrypting, on the hardware accelerator, of the first encrypted communication into the first customer communication.

6. The method of claim 5, wherein the first customer communication comprises a bitstream, which, when loaded onto the hardware accelerator, configures the hardware accelerator to perform at least some of the workflow.

7. The method of claim 5, wherein the first customer communication comprises a bitstream, which, when loaded onto the hardware accelerator, generates, on the hardware accelerator, the cryptographic information provided by the customer.

8. The method of claim 5, wherein the first cryptographic information, that is used to decrypt the first encrypted communication, is a preinstalled cryptographic key that was installed onto the hardware accelerator when the hardware accelerator was manufactured.

9. The method of claim 8, wherein the first cryptographic key is a private key of the hardware accelerator; and wherein further a public key of the hardware accelerator, corresponding to the private key of the hardware accelerator, was used to encrypt the first encrypted communication.

10. The method of claim 1, wherein the cryptographic information provided by the customer is a public key of the customer.

11. The method of claim 1, wherein the cryptographic information provided by the customer is derived from a shared secret cryptographic information that is shared with the customer.

12. A computing device providing increased workflow security in a data center, the computing device comprising:
a general-purpose central processing unit;
a hardware accelerator comprising a Field Programmable Gate Array (FPGA) device;
a network interface;
a first set of one or more computer-readable storage media comprising computer-executable instructions, which, when executed by the general-purpose central processing unit, cause the computing device to:
receive an encrypted communication from a customer of the data center;
provide, to the hardware accelerator, the encrypted communication;
retrieve, on behalf of the hardware accelerator, encrypted data stored on a storage device that is communicationally coupled to the computing device; and
provide, to the hardware accelerator, the encrypted data; and
a second set of one or more computer-readable storage media comprising computer-executable instructions, which, when executed by the hardware accelerator, cause the hardware accelerator to:
decrypt the encrypted communication using cryptographic information that is stored within the hardware accelerator and is only accessible to the hardware accelerator, the cryptographic information having been provided by the customer, wherein the retrieving performed by the computing device is performed responsive to the decrypting; and
decrypt the encrypted data using the cryptographic information;
wherein the workflow security comprises communications to and from the customer and data comprising the encrypted data.

13. The computing device of claim 12, wherein the second set of one or more computer-readable storage media comprise further computer-executable instructions, which, when executed by the hardware accelerator, cause the hardware accelerator to:
provide, to another, different hardware accelerator, the cryptographic information by encrypting the cryptographic information utilizing a cryptographic key associated with the other, different hardware accelerator in a table maintained by another computing device of the data center.

14. The computing device of claim 13, wherein the first set of one or more computer-readable storage media comprise further computer-executable instructions, which, when executed by the general-purpose central processing unit, cause the computing device to:
determine that processing to be performed by the hardware accelerator on behalf of the customer should, instead, be performed by the other, different hardware accelerator; and
instruct the hardware accelerator to provision the other, different hardware accelerator to be able to establish a second, independent workflow with the same customer.

15. The computing device of claim 13,
wherein the first set of one or more computer-readable storage media comprise further computer-executable instructions, which, when executed by the general-purpose central processing unit, cause the computing device to:
receive a first encrypted communication from the customer; and
provide, to the hardware accelerator, the first encrypted communication;
wherein further the second set of one or more computer-readable storage media comprise further computer-executable instructions, which, when executed by the hardware accelerator, cause the hardware accelerator to:
decrypt, on the hardware accelerator, the first encrypted communication into a first customer communication using a first cryptographic information that is stored within the hardware accelerator and is only accessible to the hardware accelerator; and
wherein still further the cryptographic information provided by the customer is provided, at least in part, by the decrypting, on the hardware accelerator, of the first encrypted communication into the first customer communication.

16. The computing device of claim 15, wherein the first customer communication comprises a bitstream, which, when loaded onto the hardware accelerator, configures the hardware accelerator to perform at least some of the workflow.

17. The computing device of claim 15, wherein the first customer communication comprises a bitstream, which, when loaded onto the hardware accelerator, generates, on the hardware accelerator, the cryptographic information provided by the customer.

18. The computing device of claim 15, wherein the first cryptographic information, that is used to decrypt the first encrypted communication, is a preinstalled cryptographic key that was installed onto the hardware accelerator when the hardware accelerator was manufactured.

19. The computing device of claim 15, wherein the cryptographic information provided by the customer is derived from a shared secret cryptographic information that is shared with the customer.

20. A system providing increased workflow security in a data center, the system comprising: a computer device of the data center configured to perform steps comprising: receiving an encrypted communication from a customer of the data center; providing, to a hardware accelerator, the encrypted communication; retrieving, on behalf of the hardware accelerator, encrypted data stored on a storage device that is communicationally coupled to the computing device; and providing, to the hardware accelerator, the encrypted data; and the hardware accelerator comprising a Field Programmable Gate Array (FPGA) device, the hardware accelerator configured to perform steps comprising: decrypting the encrypted communication using cryptographic information that is stored within the hardware accelerator and is only accessible to the hardware accelerator, the cryptographic information having been provided by the customer, wherein the retrieving performed by the computing device is performed responsive to the decrypting; and decrypting the encrypted data using the cryptographic information; wherein the workflow security comprises communications to and from the customer and data comprising the encrypted data.

* * * * *